UNITED STATES PATENT OFFICE.

EDGAR EVERHART, OF ATLANTA, GEORGIA, ASSIGNOR TO PIEDMONT CHEMICAL COMPANY, OF PORTLAND, MAINE.

METHOD OF MAKING ALUM.

SPECIFICATION forming part of Letters Patent No. 690,257, dated December 31, 1901.

Application filed May 16, 1901. Serial No. 60,577. (No specimens.)

*To all whom it may concern:*

Be it known that I, EDGAR EVERHART, a citizen of the United States, residing at Atlanta, in the county of Fulton and State of Georgia, have invented certain new and useful Improvements in the Manufacture of Alum; and I do hereby declare the following to be a full, clear, and exact description of the invention, such as will enable others skilled in the art to which it appertains to make and use the same.

Heretofore alum has been made by the treatment with sulfuric acid of bauxite or some other aluminous substance, with the consequent formation of sulfate of alumina, which latter substance on being dissolved in water and mixed with a solution of certain potash or ammonia salts yielded, respectively, potash or ammonia-alum.

The object of my invention is to utilize in the preparation of alum the so-called "niter-cake," (acid sodium sulfate,) which is a by-product in the manufacture of sulfuric acid and other chemical processes; and to this end my invention consists in adding to a solution of niter-cake bauxite or other suitable aluminous substances in quantities sufficient to unite with and neutralize the available acid in the niter-cake.

To carry my invention into effect, I make a hot concentrated aqueous solution of niter-cake. This solution after settling is transferred to a mixing-tank, where by suitable mechanical devices it is thoroughly and continuously stirred with bauxite or other aluminous substance. While this stirring is being carried on the whole mass is heated by means of a steam-coil or other convenient method. After the reaction is complete with the formation of soda-alum and sulfate of soda water is added in quantity sufficient to effect solution. To this solution milk of lime or an alkali is added in such amount as is necessary to neutralize any free acid that may be present. After this neutralization the solution is either filtered or else allowed to settle, the filtrate or the clear supernatant liquor, as the case may be, being conducted into vats in which the Glauber salts will crystallize out, while the soda-alum will remain in solution. After the Glauber salts have crystallized out as completely as possible the solution of the soda-alum is drained off and carried into a tank, where it is heated to boiling and mixed with the proper amount of a hot concentrated solution of potassium chlorid or potassium sulfate or the corresponding ammonia salts. The potash or ammonia-alum thus produced is purified and crystallized according to well-known methods. The mother-liquors therefrom may be concentrated by evaporation to produce a second crop of alum crystals, but finally are to be used after any necessary dilution with water to dissolve the Glauber salts from which the soda-alum solution was drained. This solution of Glauber salts just mentioned is rendered slightly alkaline with milk of lime in order to precipitate iron, alumina, and other impurities, and after settling the solution is separated from the precipitate and is drawn off into crystallizing vessels, where the pure Glauber salts will crystallize out. The mother-liquors may be concentrated to obtain one or more further crops of Glauber salts.

Having fully described my invention, what I claim, and desire to secure by Letters Patent, is—

1. The herein-described process of manufacturing alum, consisting in first adding bauxite or other aluminous substance to a solution of niter-cake, heating this compound to form soda-alum and sulfate of soda, adding a solvent, adding an alkali, drawing off the liquor, crystallizing the Glauber salts from said liquor, draining off the solution of soda-alum, heating the same and adding thereto potassium chlorid, and purifying and crystallizing the resulting product, as set forth.

2. The herein-described process of manufacturing alum, consisting in first adding bauxite or other aluminous substance to a solution of niter-cake, heating this compound to form soda-alum and sulfate of soda, adding a solvent, adding an alkali, drawing off the liquor, crystallizing the Glauber salts from said liquor, draining off the solution of soda-alum, heating the same and adding thereto potassium chlorid, purifying and crystallizing the resulting product, concentrating by evaporation the mother-liquor therefrom to produce more alum crystals, diluting the latter, dissolving with such dilution the Glauber salts from which the soda-alum was drained, rendering such solution of Glauber salts alkaline with milk of lime to precipitate iron, alumina, &c., and allowing said solution to settle and be separated from the precipitates and crystallized, as set forth.

In testimony whereof I affix my signature in presence of two witnesses.

EDGAR EVERHART.

Witnesses:
 ARTHUR MERRITT,
 BIRGER M. PARKHURST.